United States Patent
Takahashi et al.

(10) Patent No.: US 10,704,985 B2
(45) Date of Patent: Jul. 7, 2020

(54) METHOD AND APPARATUS FOR INSPECTING INTERMITTENT CONNECTION TYPE OPTICAL FIBER RIBBON AND METHOD FOR MANUFACTURING INTERMITTENT CONNECTION TYPE OPTICAL FIBER RIBBON

(71) Applicant: FUJIKURA LTD., Tokyo (JP)

(72) Inventors: Hiroyuki Takahashi, Chiba (JP); Mizuki Isaji, Chiba (JP)

(73) Assignee: Fujikura Ltd., Tokyo (JP)

( * ) Notice: Subject to any disclaimer, the term of this patent is extended or adjusted under 35 U.S.C. 154(b) by 108 days.

(21) Appl. No.: 16/068,549

(22) PCT Filed: Jul. 14, 2016

(86) PCT No.: PCT/JP2016/070780
§ 371 (c)(1),
(2) Date: Jul. 6, 2018

(87) PCT Pub. No.: WO2017/122375
PCT Pub. Date: Jul. 20, 2017

(65) Prior Publication Data
US 2019/0025156 A1   Jan. 24, 2019

(30) Foreign Application Priority Data
Jan. 14, 2016 (JP) .................. 2016-005574

(51) Int. Cl.
*G01M 11/00* (2006.01)
*G01N 21/898* (2006.01)
(Continued)

(52) U.S. Cl.
CPC ............ *G01M 11/37* (2013.01); *G01M 11/00* (2013.01); *G01N 21/892* (2013.01);
(Continued)

(58) Field of Classification Search
CPC .... G01M 11/00; G01M 11/37; G01N 21/892; G01N 21/898; G01N 2021/8927; G02B 6/448
See application file for complete search history.

(56) References Cited

U.S. PATENT DOCUMENTS

| | | | |
|---|---|---|---|
| 7,002,709 B1 * | 2/2006 | Terada | H04N 1/00846 358/1.9 |
| 7,791,652 B2 * | 9/2010 | Mitsunaga | H04N 1/4092 348/222.1 |

(Continued)

FOREIGN PATENT DOCUMENTS

| | | |
|---|---|---|
| CN | 1272631 A | 11/2000 |
| CN | 101256157 A | 9/2008 |

(Continued)

OTHER PUBLICATIONS

TexInspector, "Optical Inline Inspection System for Evenly Textured Endless Materials" OSIF GmbH, available at https://web.archive.org/web/20100928031450/http://www.osif.de/Download/Flyer_TexInspector_Eng.pdf (Year: 2010).*

(Continued)

*Primary Examiner* — Dominic J Bologna
(74) *Attorney, Agent, or Firm* — Osha Liang LLP

(57) ABSTRACT

A method for inspecting an intermittent connection type optical fiber ribbon includes: accumulating one-dimensional images in a width direction of the intermittent connection type optical fiber ribbon, arranged intermittently with connection parts that connect adjacent optical fibers by repeatedly capturing images of the intermittent connection type optical fiber ribbon along the width direction while moving the intermittent connection type optical fiber ribbon in a longitudinal direction; and creating a two-dimensional image of the intermittent connection type optical fiber ribbon by aligning the one-dimensional images in a second (Continued)

direction orthogonal to a first direction where pixels configuring the one-dimensional image are aligned.

19 Claims, 9 Drawing Sheets

(51) Int. Cl.
*G02B 6/44* (2006.01)
*G01N 21/892* (2006.01)

(52) U.S. Cl.
CPC .......... *G01N 21/898* (2013.01); *G02B 6/448* (2013.01); *G01N 2021/8927* (2013.01)

(56) References Cited

U.S. PATENT DOCUMENTS

| | | | |
|---|---|---|---|
| 2002/0134952 | A1 | 9/2002 | Ishii et al. |
| 2006/0237156 | A1* | 10/2006 | Shakespeare ...... G01N 21/8806 162/198 |
| 2008/0123929 | A1* | 5/2008 | Kitamura ................ G06K 9/00 382/132 |
| 2008/0180424 | A1* | 7/2008 | Ishihara ............... G09G 3/3611 345/204 |
| 2013/0202220 | A1* | 8/2013 | Takeshita ................ G06T 5/001 382/264 |
| 2015/0348255 | A1* | 12/2015 | Sasamoto .......... G01N 21/8806 348/86 |
| 2016/0356976 | A1* | 12/2016 | Sajima ............. B29D 11/00721 |

FOREIGN PATENT DOCUMENTS

| | | |
|---|---|---|
| CN | 104919305 A | 9/2015 |
| CN | 104919306 A | 9/2015 |
| JP | H04-84705 A | 3/1992 |
| JP | 2002-228764 A | 8/2002 |
| JP | 2006-105790 A | 4/2006 |
| JP | 2007-132858 A | 5/2007 |
| JP | 2012-42354 A | 3/2012 |
| JP | 2014-95560 A | 5/2014 |
| JP | 2015-021734 A | 2/2015 |
| JP | 2015-099126 A | 5/2015 |

OTHER PUBLICATIONS

English Machine translation of Matsuzawa et al. JP2012042354A (Year: 2012).*
Extended European Search Report issued in corresponding European Application No. 16884978.4, dated Jul. 18, 2019 (47 pages).
Osif Gmbh: "Optisches Online-Inspektionssystem für die", Jan. 31, 2008 (Jan. 31, 2008), XP055603252, Retrieved from the Internet: URL:https://web.archive.org/web/20100928031445if_/http://www.osif.de:80/Download/Flyer_TexInspector.pdf.
Notification of Reasons for Refusal issued in corresponding Japanese Patent Application No. 2016-005574 dated Jan. 31, 2017, with translation (5 pages).
Notification of Reasons for Refusal issued in corresponding Japanese Patent Application No. 2016-005574 dated Sep. 27, 2016, with translation (5 pages).
Notification of Reasons for Refusal issued in corresponding Japanese Patent Application No. 2017-092970 dated Jan. 30, 2018, with translation (5 pages).

* cited by examiner

METHOD AND APPARATUS FOR INSPECTING INTERMITTENT CONNECTION TYPE OPTICAL FIBER RIBBON AND METHOD FOR MANUFACTURING INTERMITTENT CONNECTION TYPE OPTICAL FIBER RIBBON

TECHNICAL FIELD

The present invention relates to a method and apparatus for inspecting an intermittent connection type optical fiber ribbon and a method for manufacturing an intermittent connection type optical fiber ribbon.

BACKGROUND

Patent Literatures 1 to 3 describe a method for inspecting an optical fiber ribbon (hereafter, referred to as "intermittent connection type optical fiber ribbon" or simply as "optical fiber ribbon") in which a plurality of optical fibers are arranged side by side and intermittently connected. With the method for inspecting described in Patent Literature 1, an intermittent connection type optical fiber ribbon is supported with a guide roller having a step portion, to separate non-connection parts of the intermittent connection type optical fiber ribbon, to measure an interval between edges and the number of edges and the like of the intermittent connection type optical fiber ribbon, and to detect abnormality in connection parts of the intermittent connection type optical fiber ribbon. Further, in the methods for inspecting described in Patent Literatures 2 and 3, a part in which optical fibers are not coupled (non-connection part) is widened in a width direction, this widened part is detected with a laser sensor, and the intermittently coupled state of the intermittent connection type optical fiber ribbon is inspected.

PATENT LITERATURE

[PTL 1] Japanese Patent Application Publication No. 2012-42354
[PTL 2] Japanese Patent Application Publication No. 2014-95560
[PTL 3] Japanese Patent Application Publication No. 2015-21734

SUMMARY

With the intermittent connection type optical fiber ribbon, because the connection part is intermittently formed in the width direction and the longitudinal direction, as in Patent Literature 1 a measurement value of the edge intervals and number of edges in the width direction changes over time with moving of a workpiece, and becomes a time waveform with a periodic feature (refer to FIGS. 4, 5, 9, 10 in Patent Literature 1). Because this time waveform depends on an intermittent connection state of the optical fiber ribbon, an abnormality can be sensed by observing the feature of the time waveform (period, amplitude, shape and the like).

When the number of optical fibers of the optical fiber ribbon increases, however, it is difficult to determine a connection state of the intermittent connection type optical fiber ribbon (information of length of connection part and non-connection part and the like) based on time waveform of edge intervals and the number of edges, and in the case where abnormality is sensed the cause of abnormality is difficult to specify.

Patent Literatures 2 and 3 do not specifically describe how to detect an intermittently coupled state from measurement results of a laser sensor. Taking into account that a hole for irradiating laser beam is arranged for each coupling part (refer to FIG. 8 of Patent Literature 2), however, when the number of optical fibers of the optical fiber ribbon increases, arranging of the laser sensor (position adjustment) is expected to be extremely difficult.

One or more embodiments of the present invention provide a method to inspect an intermittent connection type optical fiber ribbon with high accuracy even when the number of optical fibers of the intermittent connection type optical fiber ribbon increases.

One or more embodiments are directed to a method for inspecting an intermittent connection type optical fiber ribbon including:

accumulating one-dimensional images in a width direction of an intermittent connection type optical fiber ribbon arranged intermittently with connection parts that connect adjacent optical fibers, by repeating capturing (e.g., capturing at least twice) an image of an intermittent connection type optical fiber ribbon along the width direction, while making the intermittent connection type optical fiber ribbon move in a longitudinal direction; and creating a two-dimensional image of the optical fiber ribbon by aligning a plurality of the one-dimensional images that have been accumulated in a second direction orthogonal to a first direction in which pixels configuring the one-dimensional image are aligned.

Other features of one or more embodiments of the present invention will become clear from the description in this specification and drawings to be described below.

According to one or more embodiments of the present invention, even in the case where the number of optical fibers of an intermittent connection type optical fiber ribbon increases, the intermittent connection type optical fiber ribbon can be inspected with high accuracy.

DETAILED DESCRIPTION

Figure 1A:
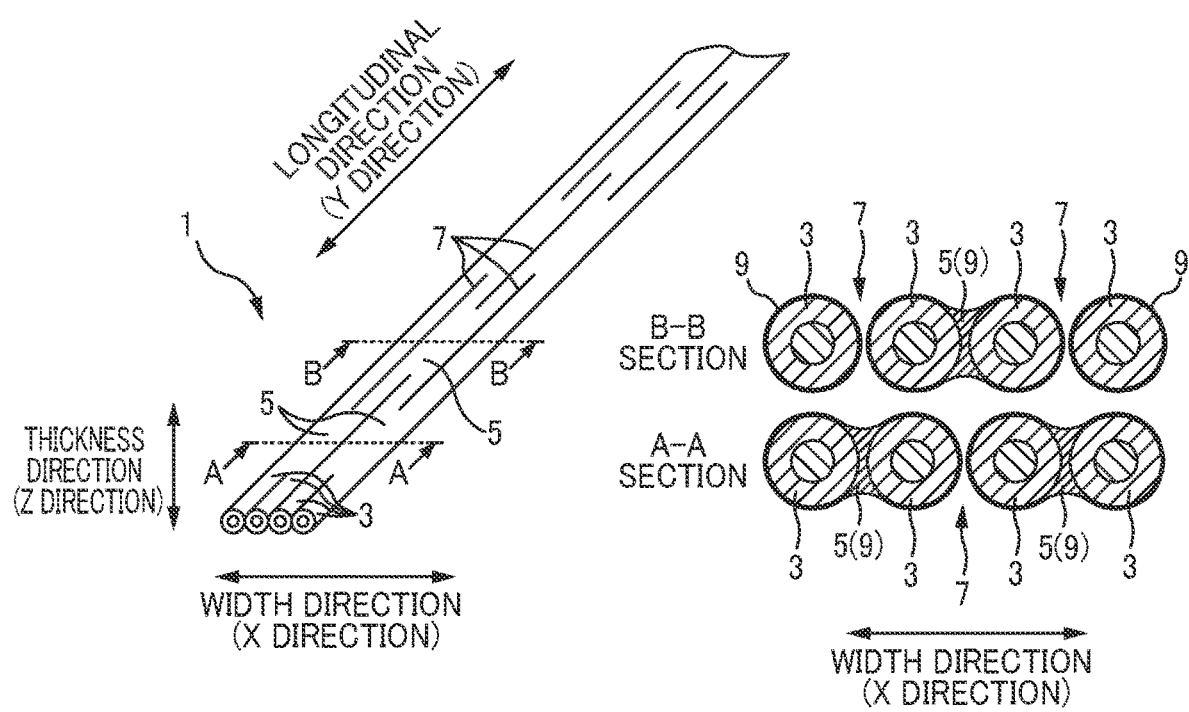
FIG. 1A is an explanatory view of a 4-core intermittent connection type optical fiber ribbon 1 according to one or more embodiments. Drawings on the right in FIG. 1A are cross-sectional views along line A-A or B-B of a perspective view on the left side.

At least below matters will become clear from descriptions in this specification and attached drawings to be described below.

A method for inspecting an intermittent connection type optical fiber ribbon will become clear including: accumulating one-dimensional images in a width direction of an intermittent connection type optical fiber ribbon arranged intermittently with connection parts that connect adjacent optical fibers, by repeating capturing an image of an intermittent connection type optical fiber ribbon along the width direction, while making the intermittent connection type optical fiber ribbon move in a longitudinal direction; and creating a two-dimensional image of the optical fiber ribbon by aligning a plurality of the one-dimensional images that have been accumulated in a second direction orthogonal to a first direction in which pixels configuring the one-dimensional image are aligned. According to such a method for inspecting, the connection state of the intermittent connection type optical fiber ribbon can be inspected with high accuracy, regardless of the number of optical fibers of the intermittent connection type optical fiber ribbon.

A non-connection part of the intermittent connection type optical fiber ribbon is widened in the width direction, while the intermittent connection type optical fiber ribbon is made to move in the longitudinal direction, and an image of the optical fiber ribbon is captured along the width direction before the widened non-connection part closes. In this way, a two-dimensional image in which a connection state can be easily inspected can be obtained.

Capturing an image of the intermittent connection type optical fiber ribbon along the width direction is repeated, in synchronization with a linear velocity of the intermittent connection type optical fiber ribbon. In this way, a one-dimensional image can be captured every time the optical fiber ribbon moves for a predetermined length, and the second direction of a two-dimensional image can be made as a predetermined resolution.

At the time a shorter one of a connection part and a non-connection part of the intermittent connection type optical fiber ribbon is made to have a length L, an image of the intermittent connection type optical fiber ribbon is captured a plurality of times (e.g., repeatedly, meaning at least twice) along the width direction, for every time the intermittent connection type optical fiber ribbon moves by a distance L in the longitudinal direction. In this way, a two-dimensional image with a satisfactory resolution can be obtained.

Based on the two-dimensional image, a mean value of gradation values of a plurality of pixels aligned in the second direction in that position is calculated for each position of pixels configuring the one-dimensional image, and based on an extreme value of each mean value, a boundary position of an adjacent optical fiber in the two-dimensional image is determined. In this way, positions of connection parts and non-connection parts between two optical fibers in the two-dimensional image can be determined.

By extracting gradation values along the second direction in the boundary position, boundary data indicating the one-dimensional image in the boundary position is obtained. In this way, one-dimensional image data (boundary data) indicating connection parts and non-connection parts intermittently arranged in the longitudinal direction can be obtained.

A low-pass filter is applied to the boundary data. In this way, noise of the boundary data can be removed.

Binarization processing is performed to the boundary data. In this way, areas of connection parts and areas of non-connection parts can be clearly divided.

An evaluation parameter is calculated based on the boundary data, and a connection state of the intermittent connection type optical fiber ribbon is evaluated based on the evaluation parameter. In this way, the connection state of the intermittent connection type optical fiber ribbon can be inspected with high accuracy, regardless of the number of optical fibers of the intermittent connection type optical fiber ribbon.

An evaluation parameter showing a relation of a relative connection state between boundary positions is further calculated from an evaluation parameter based on the boundary data in a certain boundary position and an evaluation parameter based on the boundary data in another boundary position. In this way, for example, whether connection parts are arranged inclined and the like can be evaluated.

An apparatus for inspecting an intermittent connection type optical fiber ribbon will become clear, including: an image capturing device that captures an image along a width direction of an intermittent connection type optical fiber ribbon arranged intermittently with connection parts that connect adjacent optical fibers, while making the intermittent connection type optical fiber ribbon move in a longitudinal direction; and a control section that makes the image capturing device repeat capturing an image of the optical fiber ribbon along the width direction, accumulates one-dimensional images of the optical fiber ribbon in the width direction, aligns a plurality of the one-dimensional images that have been accumulated in a second direction orthogonal to a first direction in which pixels configuring the one-dimensional image are aligned, to create a two-dimensional image of the optical fiber ribbon. According to such an apparatus for inspecting, the connection state of the intermittent connection type optical fiber ribbon can be inspected with high accuracy, regardless of the number of optical fibers of the intermittent connection type optical fiber ribbon.

A method for manufacturing an intermittent connection type optical fiber ribbon will become clear, including: manufacturing an intermittent connection type optical fiber ribbon arranged intermittently with connection parts that connect adjacent optical fibers; accumulating one-dimensional images of the optical fiber ribbon in a width direction, by repeating capturing an image of the optical fiber ribbon along the width direction while making the intermittent connection type optical fiber ribbon move in a longitudinal direction; and creating a two-dimensional image of the optical fiber ribbon by aligning a plurality of the one-dimensional images that have been accumulated in a second direction orthogonal to a first direction aligned with pixels configuring the one-dimensional image. According to such a method for manufacturing, the connection state of the intermittent connection type optical fiber ribbon can be inspected with high accuracy, regardless of the number of optical fibers of the intermittent connection type optical fiber ribbon.

An apparatus for manufacturing an intermittent connection type optical fiber ribbon will become clear, including: a ribbon forming section that forms an intermittent connection type optical fiber ribbon arranged intermittently with connection parts that connect adjacent optical fibers; an image capturing device that captures an image of the optical fiber ribbon along a width direction while making the optical fiber ribbon move in a longitudinal direction; and a control section that creates a two-dimensional image of the optical fiber ribbon by making the image capturing device repeat capturing an image of the optical fiber ribbon along a width direction, accumulates one-dimensional images of the optical fiber ribbon in the width direction, aligns a plurality of the one-dimensional images that have been accumulated in a second direction orthogonal to a first direction in which pixels configuring the one-dimensional images are aligned. According to such an apparatus for manufacturing, the connection state of the intermittent connection type optical fiber ribbon can be inspected with high accuracy, regardless of the number of optical fibers of the intermittent connection type optical fiber ribbon.

<Intermittent Connection Type Optical Fiber Ribbon 1>

Figure 1B:
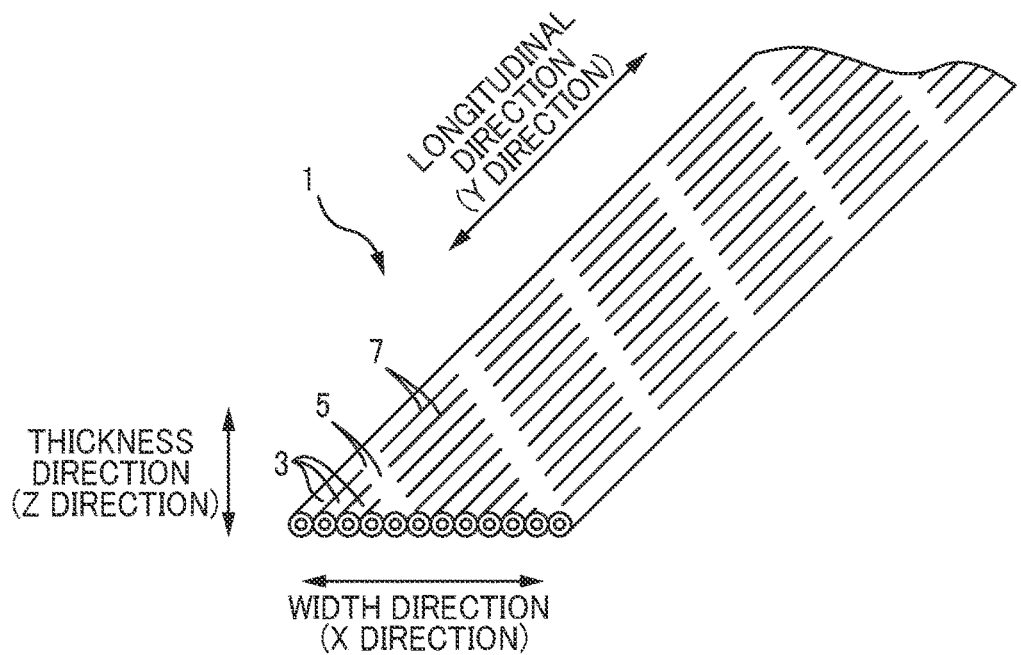
FIG. 1B is an explanatory view of a 12-core intermittent connection type optical fiber ribbon 1.

FIG. 1A is an explanatory view of a 4-core intermittent connection type optical fiber ribbon 1 according to one or more embodiments. Drawings on the right in FIG. 1A are cross-sectional views along line A-A or B-B of a perspective view on the left side. FIG. 1B is an explanatory view of a 12-core intermittent connection type optical fiber ribbon 1.

In the below description, as shown in FIG. 1A, each direction is defined. In other words, a direction parallel to an optical fiber 3 configuring the optical fiber ribbon 1 is referred to as a "longitudinal direction". Further, a direction aligned with a plurality of optical fiber 3 configuring the optical fiber ribbon 1 is referred to as a "width direction". Further, a direction perpendicular to a ribbon surface of the optical fiber ribbon 1 is referred to as a "thickness direction".

The intermittent connection type optical fiber ribbon 1 is an optical fiber ribbon 1 made by arranging side by side and intermittently connecting a plurality of optical fibers 3. Adjacent 2-core optical fibers 3 are connected with connection parts 5. The plurality of the connection parts 5 that connect adjacent 2-core optical fibers 3 are intermittently arranged in the longitudinal direction. Further, the plurality of the connection parts 5 of the optical fiber ribbon 1 are intermittently arranged 2-dimensionally in the longitudinal direction and the width direction. The connection part 5 is formed by applying an ultraviolet curable resin 9 to be an adhesive and then irradiating an ultraviolet ray and being set. It is also possible to configure the connection part 5 with a thermoplastic resin. Regions other than the connection parts 5 between adjacent 2-core optical fibers 3 are made as non-connection parts 7 (separation sections). In the non-connection part 7 the adjacent 2-core optical fibers 3 are not restrained to each other. In this way, the optical fiber ribbon 1 can be rounded into a tube shape (bundle) or can be folded up, and multiple optical fibers 3 can be stored in high density.

The intermittent connection type optical fiber ribbon 1 is not limited to that shown in FIG. 1A and FIG. 1B. For example, the number of optical fibers of the optical fiber ribbon 1 may be changed. Further, the arrangement of the connection parts 5 that are intermittently arranged may be changed.

<Apparatus 10 for Manufacturing Intermittent Connection Type Optical Fiber Ribbon 1>

Figure 2:
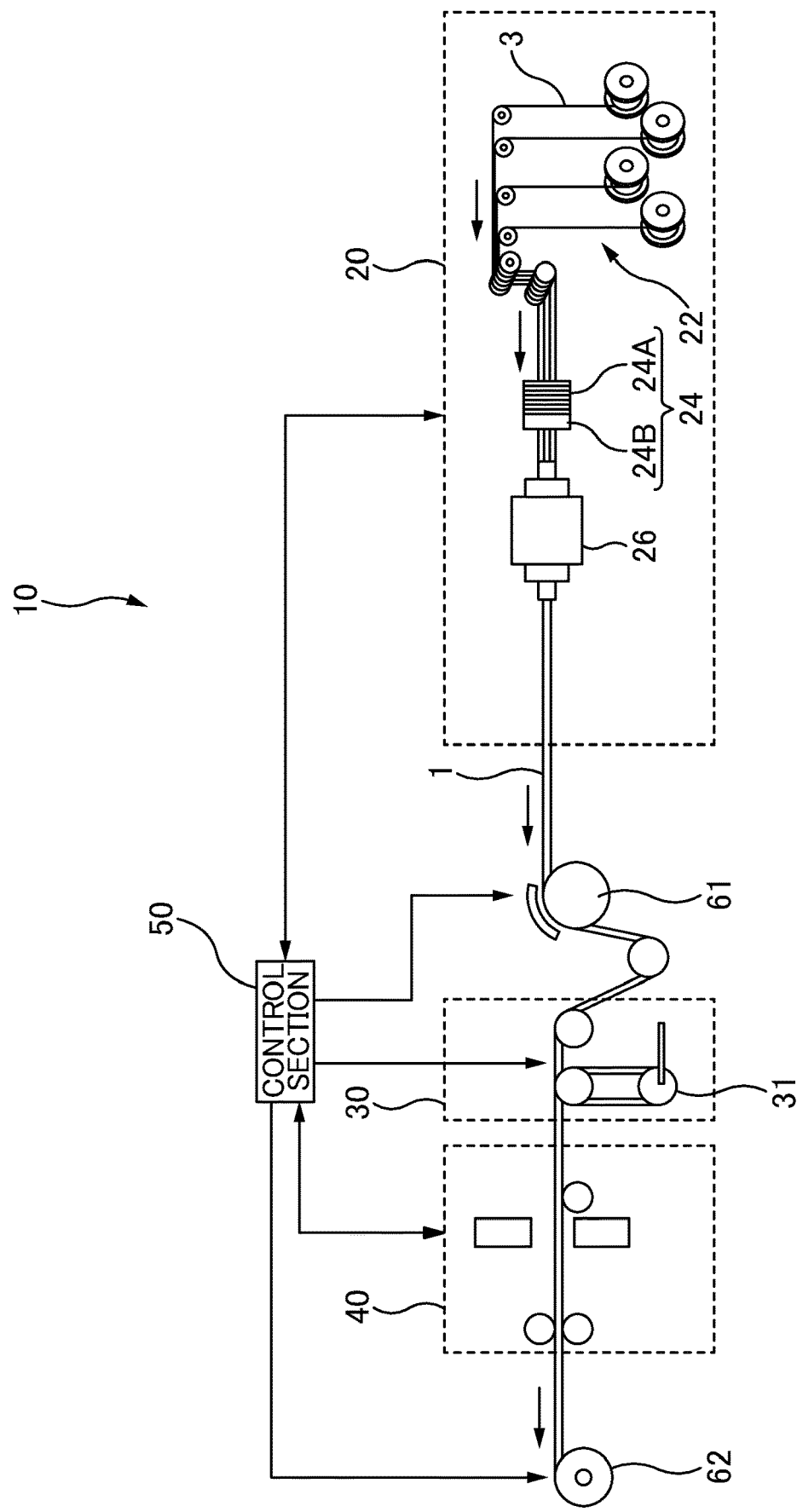
FIG. 2 is an explanatory view of apparatus 10 for manufacturing an intermittent connection type optical fiber ribbon 1 according to one or more embodiments.

FIG. 2 is an explanatory view of an apparatus 10 for manufacturing an intermittent connection type optical fiber ribbon 1 according to one or more embodiments. The apparatus 10 for manufacturing has a ribbon forming section 20, a tension adjusting section 30, a measuring section 40, and a control section 50. The control section 50 controls a ribbon forming section 20, a tension adjusting section 30, and a measuring section 40. The apparatus 10 for manufacturing has a take-over device 61 (take-over roller) that takes over the optical fiber ribbon 1 from the ribbon forming section 20, a take-up device 62 (take-up drum) to take-up the optical fiber ribbon 1, and the control section 50 also controls the take-over device 61 and the take-up device 62.

The ribbon forming section 20 is a device that forms the intermittent connection type optical fiber ribbon 1. The ribbon forming section 20 has a plurality of optical fiber supplying sections 22, an intermittently applying section 24, and a light source 26. The optical fiber supplying section 22 is a supplying device (supply source) that supplies optical fibers 3 to the intermittently applying section 24. The intermittently applying section 24 is a device that intermittently applies ultraviolet curable resin 9 between two adjacent optical fibers 3. When the optical fibers 3 have passed through the intermittently applying section 24, ultraviolet curable resin 9 is applied intermittently between the optical fibers 3. The light source 26 is an irradiating device that irradiates ultraviolet rays. When the optical fibers 3 are supplied to the light source 26, the ultraviolet curable resin 9 that has been applied intermittently cures, to form the intermittent connection type optical fiber ribbon 1 shown in FIG. 1A and FIG. 1B.

The tension adjusting section 30 is a device to adjust tension to the intermittent connection type optical fiber ribbon 1. The tension adjusting section 30 has a dancer roller 31. The method to adjust tension of the optical fiber ribbon 1 is not limited to using the dancer roller 31, and may be other methods. The tension adjusting section 30 is arranged to an upstream side of the measuring section 40, and the optical fiber ribbon 1 that has been adjusted in tension is supplied to the measuring section 40.

The take-over device 61 (take-over roller) is arranged between the tension adjusting section 30 and the ribbon forming section 20. With the take-over device 61 taking over the optical fiber ribbon 1 from the ribbon forming section 20, tension of the optical fiber ribbon 1 to the upstream side than the take-over device 61 and tension of the optical fiber ribbon 1 to the downstream side than the take-over device 61 can be made different from each other. Thus, even when the tension adjusting section 30 adjusts tension of the optical fiber ribbon 1, tension of the optical fiber ribbon 1 to the upstream side than the take-over device 61 is maintained, thus tension of the optical fiber ribbon 1 in the ribbon forming section 20 does not have to be changed. Supposing that tension of an optical fiber ribbon 1 in the ribbon forming section 20 changes, for example, malfunctions such as abnormal contact between an optical fiber 3 and a coating die 24A may arise, but in one or more embodiments such malfunction may not arise.

The measuring section 40 is a device that measures the intermittent connection type optical fiber ribbon 1. The measuring section 40 configures an apparatus for inspecting the optical fiber ribbon 1, together with the control section 50.

Figure 3:
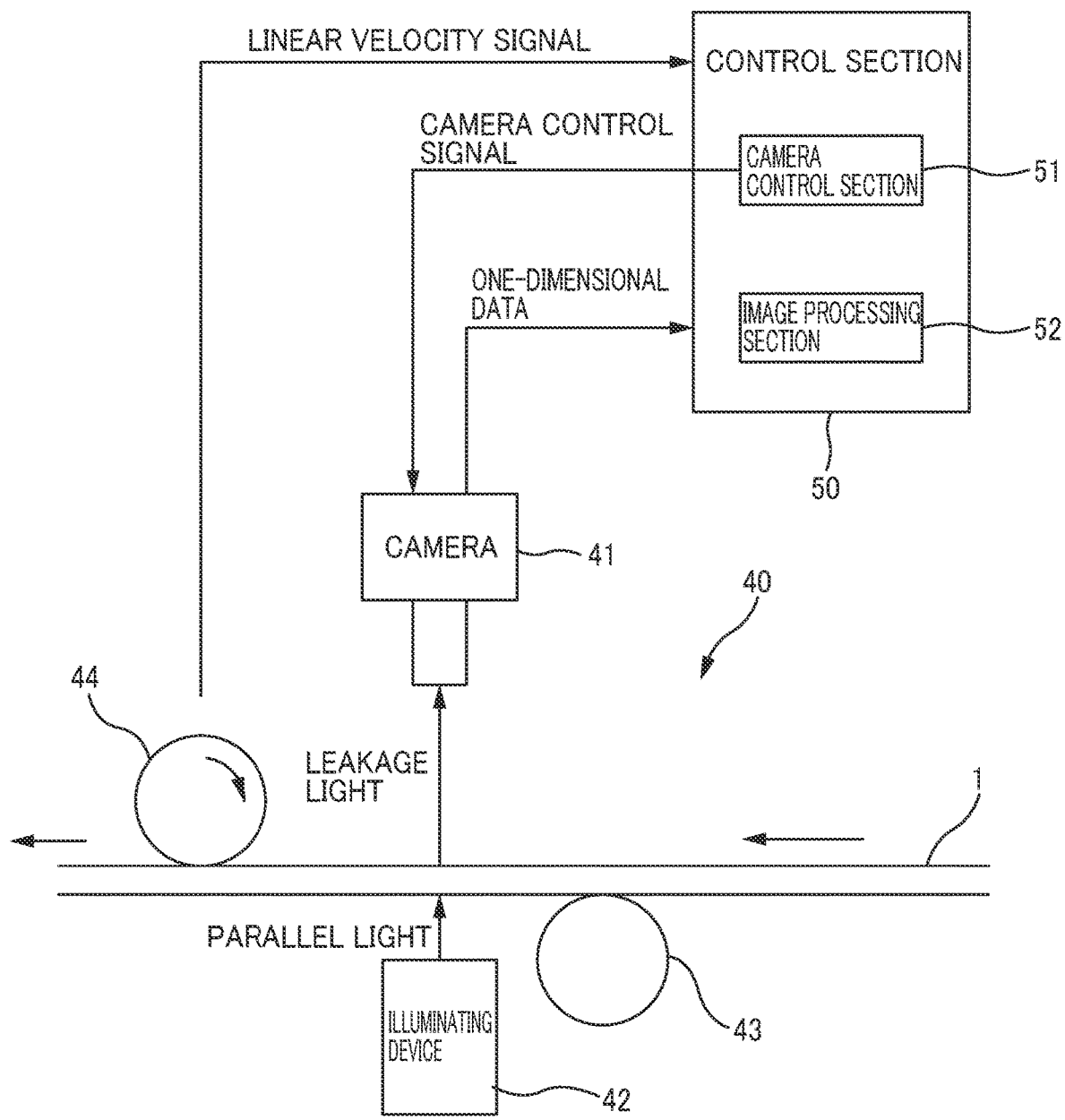
FIG. 3 is an explanatory view of an apparatus for inspecting an intermittent connection type optical fiber ribbon 1 according to one or more embodiments.

FIG. 3 is an explanatory view of an apparatus for inspecting the intermittent connection type optical fiber ribbon 1 according to one or more embodiments. The apparatus for inspecting is configured from the measuring section 40 and the control section 50. Thus, the apparatus 10 for manufacturing of one or more embodiments includes an apparatus for inspecting the intermittent connection type optical fiber ribbon 1. The measuring section 40 has a camera 41, an illuminating device 42, a guide roller 43, and a linear velocity sensing section 44.

The camera 41 is a one-dimensional image camera (image capturing device) that obtains a one-dimensional image along a width direction of the intermittent connection type optical fiber ribbon 1. In other words, the camera 41 is a measuring device that measures light quantity distribution in the width direction. The camera 41 has a CMOS sensor (or CCD sensor) having multiple light receiving elements arranged in the width direction, which is not shown, and a telecentric optical system. The illuminating device 42 is a device that irradiates an illuminating light (here, parallel light) to the optical fiber ribbon 1. The optical fiber ribbon 1 is arranged between the camera 41 and the illuminating device 42, and the camera 41 detects illuminating light (leakage light) through the optical fiber ribbon 1 and measures light quantity distribution along the width direction. Here, parallel light is irradiated to the optical fiber ribbon 1 as illuminating light, and the camera 41 measures the light quantity distribution of the leakage light through the optical fiber ribbon 1 via the telecentric optical system. In this way, the light quantity distribution in the width direction can be measured with little distortion. In regions where illuminating light is blocked with the optical fibers 3 and the connection parts 5 of the optical fiber ribbon 1, the detected light quantity is small, and in the non-connection parts 7 of the optical fiber ribbon 1, the detected light quantity is large. Even when there is no illuminating device 42 one-dimensional images can be obtained with the camera 41, but a high contrast image can be obtained by using the illuminating device 42. The camera 41, however, does not detect illuminating light (leakage light) through the optical fiber ribbon 1, but may detect diffusion light from the optical fiber ribbon 1, and may obtain one-dimensional images along the width direction of the intermittent connection type optical fiber ribbon 1. The camera 41 outputs data (one-dimensional image data) showing one-dimensional image to the control section 50.

The guide roller 43 is a member that widens the non-connection parts 7 of the intermittent connection type optical fiber ribbon 1 in the width direction. The guide roller 43 is arranged slightly to the upstream side than an image capturing position of the camera 41. The non-connection parts 7 that have been widened with the guide roller 43 close immediately due to tension of the optical fiber ribbon 1, thus the guide roller 43 is arranged as close to the image capturing position of the camera 41 as possible, such that the camera 41 can capture an image of the optical fiber ribbon 1 before the non-connection parts 7 close. As the non-connection parts 7 are widened in the width direction with the guide roller 43, leakage light from the non-connection parts 7 increases, and the camera 41 can easily obtain images of the non-connection parts 7. The measuring device, however, does not have to have the guide roller 43.

Figure 4A:
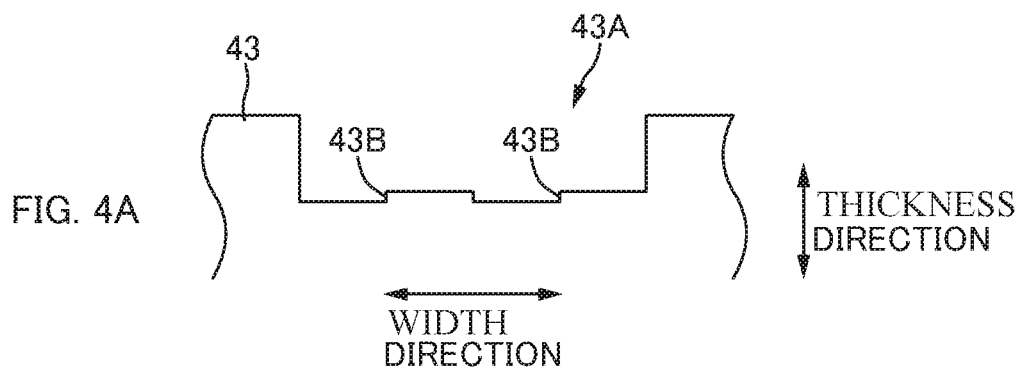
FIG. 4A is a cross-sectional view showing a configuration of a guide roller 43 according to one or more embodiments.
Figure 4B:
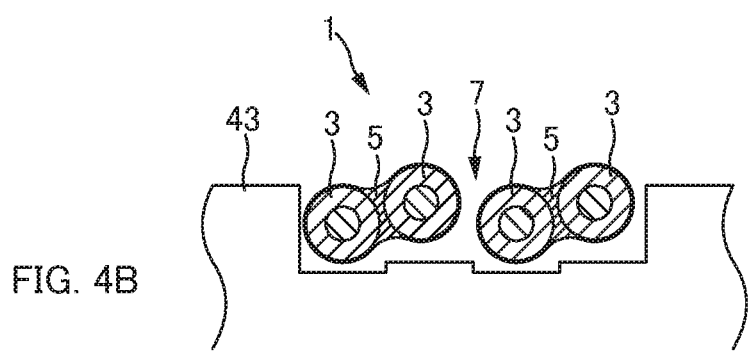
FIG. 4B to FIG. 4D are explanatory views showing non-connection parts 7 being widened with a guide roller 43.
Figure 4C:
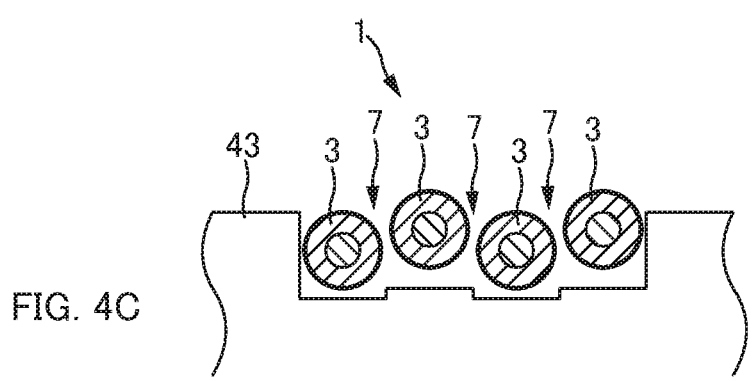
Figure 4D:
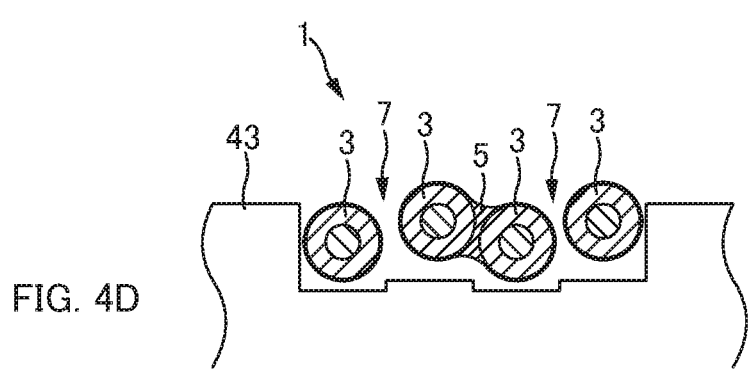

FIG. 4A is a cross-sectional view showing a configuration of the guide roller 43 according to one or more embodiments. FIG. 4B to FIG. 4D are explanatory views of non-connection parts 7 being widened with the guide roller 43. The guide roller 43 has guide grooves 43A that are wider than the width of the intermittent connection type optical fiber ribbon 1. At least one step portion 43B is provided to a bottom portion of the guide grooves 43A. The number and step height of the step portion 43B is set appropriately according to the number of optical fibers of the optical fibers 3 configuring the optical fiber ribbon 1. Here, the guide roller 43 has one less step portion 43B (3) than the number of optical fibers (4) of the optical fibers 3 configuring the optical fiber ribbon 1.

Figure 5A:
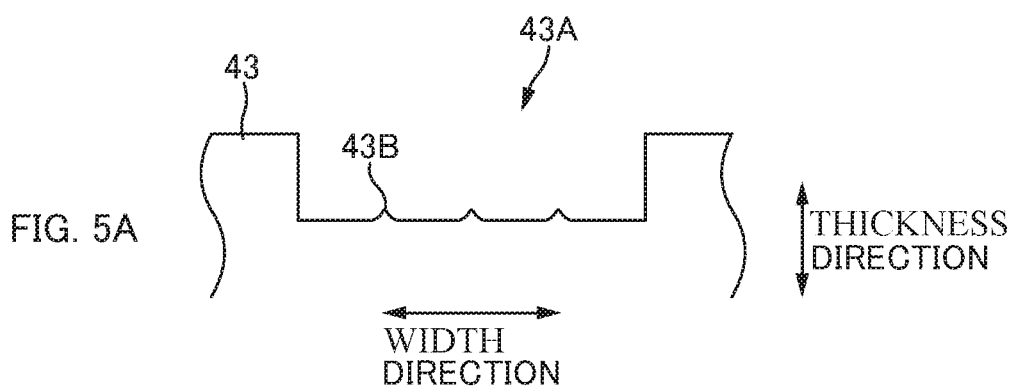
FIG. 5A is cross-sectional view showing a configuration of a guide roller 43 in a modified example according to one or more embodiments.
Figure 5B:
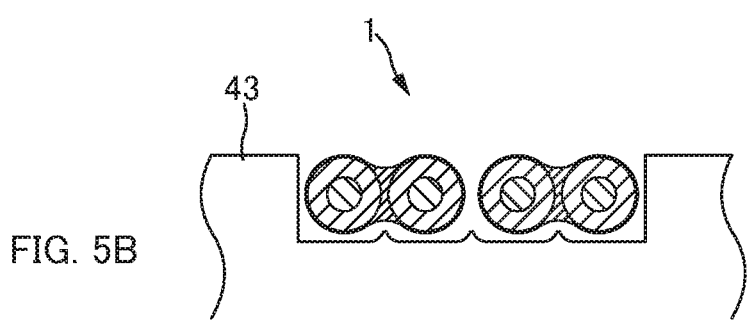
FIG. 5B to FIG. 5D are explanatory views showing non-connection parts 7 being widened with a guide roller 43 in a modified example.
Figure 5C:
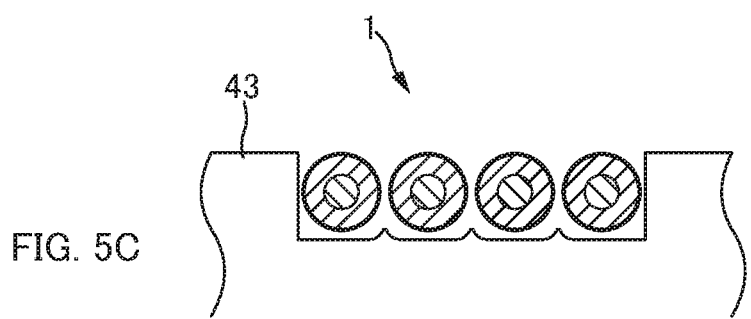
Figure 5D:
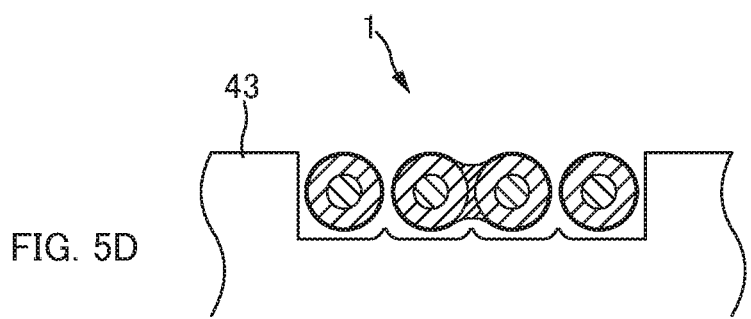

FIG. 5A is a cross-sectional view showing a configuration of a guide roller 43 that is a modified example according to one or more embodiments. FIG. 5B to FIG. 5D are explanatory views showing non-connection parts 7 being widened with the guide roller 43 of the modified example. As also shown in the modified example, a measure to widen the non-connection part 7 is not limited to the guide roller 43 shown in FIG. 4A. A bottom surface of the guide grooves 43A of the guide roller 43 may be further sloped.

The linear velocity sensing section 44 (refer to FIG. 3) is a sensor that detects a linear velocity of the intermittent connection type optical fiber ribbon 1. The linear velocity sensing section 44 may also serve as the take-over device 61 shown in FIG. 2, or may be a different part from the take-over device 61. Further, as long as the linear velocity sensing section 44 can detect the linear velocity of the intermittent connection type optical fiber ribbon 1, the linear velocity sensing section 44 may be arranged to an upstream side of the image capturing position of the camera 41, or may be arranged to a downstream side.

The control section 50 that configures the apparatus for inspecting has a camera control section 51 and an image processing section 52.

The camera control section 51 controls the camera 41 of the measuring section 40. The camera control section 51 is configured from an electronic circuit and the like such as a microcomputer or a PLD, for example. The camera control section 51 outputs to the camera 41 a camera control signal to control the camera 41, and in this way controls the camera 41. The camera control signal includes, for example, a clock signal, a shutter signal indicating a timing of releasing a shutter, and the like.

The camera control section 51 outputs a shutter signal in a period according to a linear velocity signal from the linear velocity sensing section 44 to the camera 41, and makes the camera 41 repeat capturing an image in a period according to a linear velocity of the optical fiber ribbon 1. In other words, the camera control section 51 is synchronized to the linear velocity of the optical fiber ribbon 1, to make the camera 41 perform capturing an image. In this way, the camera control section 51 can output to the camera 41 a shutter signal for every time the optical fiber ribbon 1 moves for a predetermined length (for example, 1 mm), and can make the camera 41 capture one-dimensional images along the width direction for every time the optical fiber ribbon 1 moves for a predetermined length. Further, in this way, a longitudinal direction (Y direction) of the two-dimensional image to be described later can be made as a predetermined resolution. The camera 41 captures an image of the one-dimensional images according to the shutter signals from the camera control section 51, and outputs one-dimensional image data to the control section 50. In this way, in synchronization with the linear velocity of the optical fiber ribbon 1, capturing an image is performed every time the optical fiber ribbon 1 is moved for a predetermined length (for example, 1 mm), thus the optical fiber ribbon 1 is captured for every predetermined interval (for example, 1 mm).

In the case that a shorter length of the connection part 5 and the non-connection part 7 (dimension in longitudinal direction) is L, a plurality of times of capturing an image is performed every time the optical fiber ribbon 1 moves for the distance L. In this way, connection parts 5 and non-connection parts 7 in the two-dimensional image to be described later are configured with a plurality of pixels along the longitudinal direction (Y direction), and the two-dimensional image (to be described later) with sufficient resolution can be obtained, and thus the connection state of the intermittent connection type optical fiber ribbon 1 can be inspected with high accuracy.

The image processing section 52 processes data of one-dimensional images obtained from the camera 41. The image processing section 52 is configured from a personal computer and the like including, for example, a processing device (for example, CPU) and a storage device.

Figure 6:
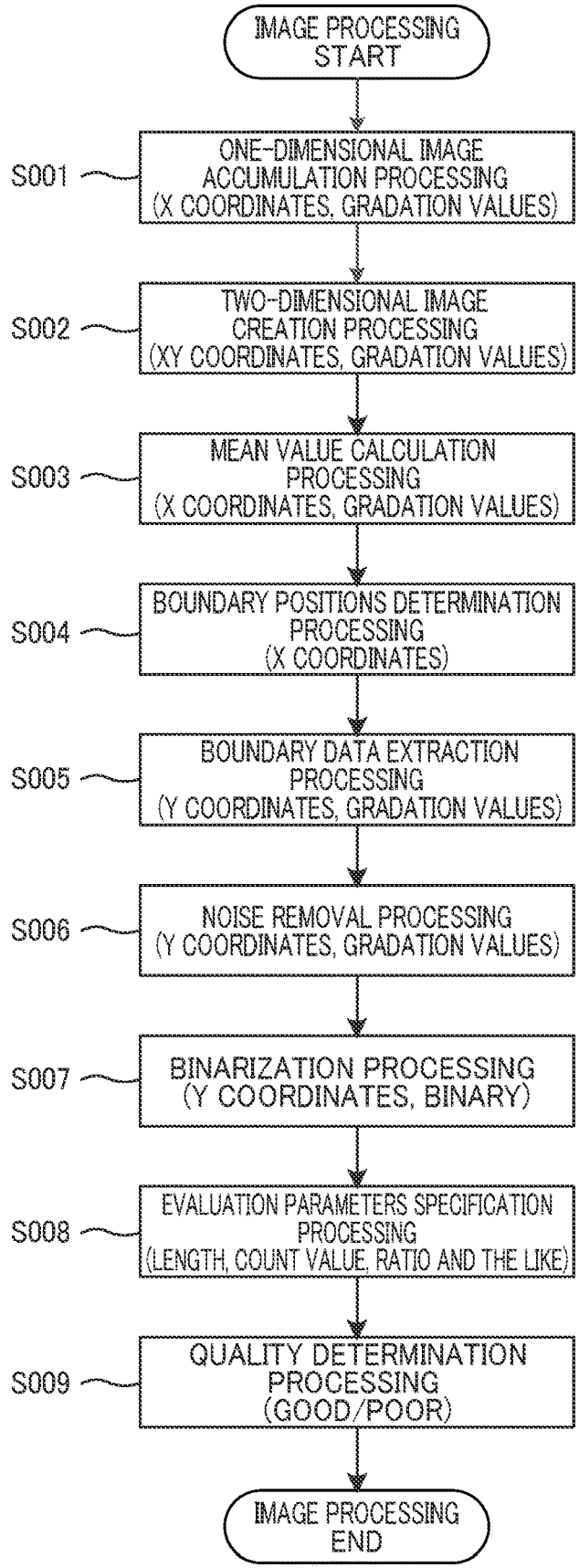
FIG. 6 is a flow diagram of processing to be performed with an image processing section 52 according to one or more embodiments.

FIG. 6 is a flow diagram of processing performed with the image processing section 52 according to one or more embodiments. Various processing in the figure are achieved by a computer performing an image processing program.

First, the image processing section 52 accumulates data of the one-dimensional image repeatedly output from the camera 41 (S001). In this way, the one-dimensional image along the width direction is accumulated for every predetermined interval (for example, 1 mm) in the longitudinal direction.

Figure 7:
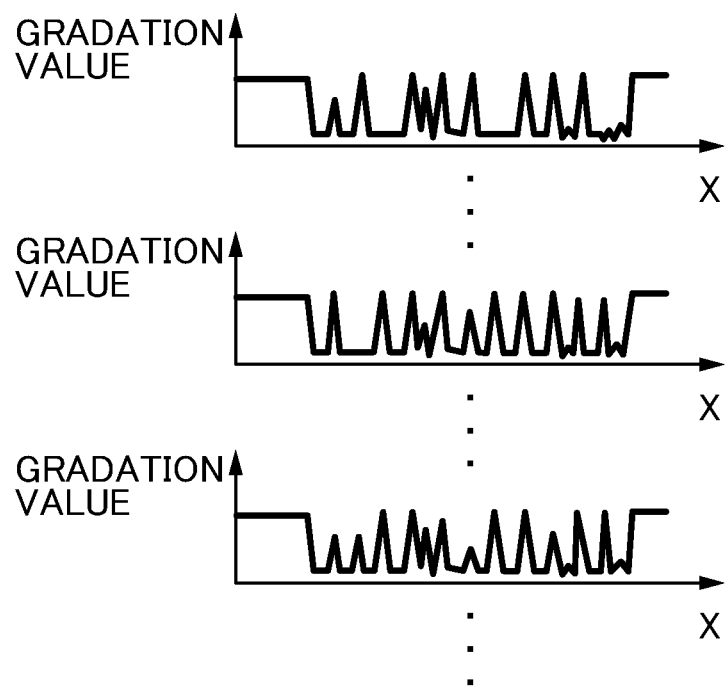
FIG. 7 is an explanatory view of data of one-dimensional images accumulated with the image processing section 52 according to one or more embodiments.

FIG. 7 is an explanatory view of data of one-dimensional images that are accumulated with the image processing section 52. Data of the one-dimensional image is data in which a gradation value is corresponded to each of multiple pixels aligned in the X direction. In other words, this data of one-dimensional images is data in which gradation values are corresponded to X coordinates (positions of pixels aligned in the X direction). Here, the X direction in the image (a first direction in which pixels configuring the one-dimensional image are aligned) corresponds to the width direction of the intermittent connection type optical fiber ribbon 1. A gradation value corresponded to each pixel is data according to a light quantity detected with a light receiving element (corresponds to pixel) of the camera 41.

With the one-dimensional image, pixels showing dark gradation values is a region in which illuminating light is shielded (refer to FIG. 3), and is considered to be a region corresponding to an optical fiber 3 or a connection part 5 of an optical fiber ribbon 1. On the other hand, pixels showing light gradation values is a region in which leakage light from an optical fiber ribbon 1 (refer to FIG. 3) is detected, and is considered as a region corresponding to a non-connection part 7 of an optical fiber ribbon 1 (or a region to an outer side of an optical fiber ribbon 1 in the width direction).

By the way, as connection parts 5 and non-connection parts 7 of an optical fiber ribbon 1 are intermittently included in an image capturing range, it is difficult to determine the quality of a connection state of an optical fiber ribbon 1 from data of a single one-dimensional image. Further, with the intermittent connection type optical fiber ribbon 1 the connection part 5 is intermittently formed in the width direction and the longitudinal direction, and thus data of the one-dimensional image varies over time as shown in FIG. 7. This variation over time becomes more complicated as the number of optical fibers of the optical fiber ribbon 1 increases, so that when the number of optical fibers of the optical fiber ribbon 1 increases it becomes difficult to determine the quality of the connection state from the variation pattern of data of the one-dimensional image. The image processing section 52 of one or more embodiments decides the quality of the connection state of the optical fiber ribbon 1 as below.

The image processing section 52 creates a two-dimensional image based on accumulated multiple one-dimensional images (S002). The two-dimensional image is an image configured from pixels arranged 2-dimensionally in the X direction and the Y direction. Data of the two-dimensional image is data in which gradation values are corresponded to each of the multiple pixels aligned in the X direction and the Y direction. The image processing section 52 creates a two-dimensional image by aligning in order of accumulation the accumulated plurality of one-dimensional images in the Y direction (a second direction orthogonal to a first direction in which pixels configuring the one-dimensional image are aligned).

Figure 8:
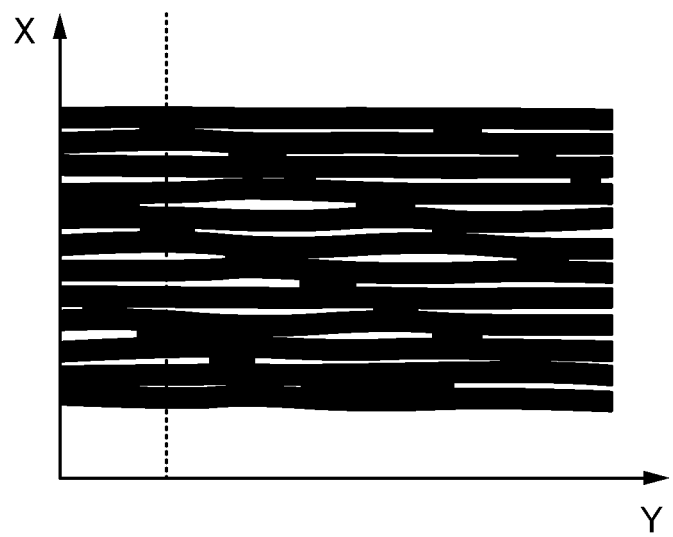
FIG. 8 is an explanatory view of a two-dimensional image created with an image processing section 52 according to one or more embodiments.

FIG. 8 is an explanatory view of a two-dimensional image created with the image processing section 52 according to one or more embodiments. Dotted lines parallel to an X axis in the figure show positions of one-dimensional images of FIG. 7. As shown in FIG. 8, the two-dimensional image is an image of an intermittent connection type optical fiber ribbon 1 seen from a thickness direction. The X direction in the two-dimensional image corresponds to the width direction of the optical fiber ribbon 1, and the Y direction in the two-dimensional image corresponds to the longitudinal direction of the optical fiber ribbon 1. Thus, the optical fibers 3 are aligned along the Y direction in the two-dimensional image, and adjacent two optical fibers 3 are aligned in the X direction. Further, in the two-dimensional image, connection parts 5 and non-connection parts 7 between adjacent two optical fibers 3 are arranged along the Y direction.

In one or more embodiments, the guide roller 43 widens the non-connection parts 7 of the intermittent connection type optical fiber ribbon 1, thus the non-connection parts 7 can appear clearly in the two-dimensional image. The non-connection parts 7 widened with the guide roller 43 close immediately due to tension, but in one or more embodiments, the intermittent connection type optical fiber ribbon 1 is captured along the width direction before the non-connection parts 7 close, so that by creating the two-dimensional image based on the accumulated one-dimensional image, an image in which the non-connection parts 7 are widened in the width direction over the entire longitudinal direction can be obtained. Thus, compared to the state of the intermittent connection type optical fiber ribbon 1 in the apparatus 10 for manufacturing, the optical fiber ribbon 1 in the two-dimensional image is in a state in which it is easier to evaluate the states of the connection parts 5 and the non-connection parts 7.

The image processing section 52 may be displayed as an inspection result of a two-dimensional image on a display which is not shown. In this case, a supervisor of a manufacturing line can evaluate the connection state of the intermittent connection type optical fiber ribbon 1 based on the two-dimensional image displayed on the display. For example, in the case where specific two connection parts 5 are not formed, the supervisor of the manufacturing line can easily inspect a defect of the optical fiber ribbon 1 based on the two-dimensional image displayed on the display. In one or more embodiments, however, when the image processing section 52 performs the next processing, the connection state of the intermittent connection type optical fiber ribbon 1 is automatically evaluated.

The image processing section 52 calculates, based on the two-dimensional image, for every position of pixels aligned in the X direction (X coordinates), a mean value of gradation values of the plurality of pixels aligned in the Y direction in that position (FIG. 6: S003). Processing in S003 is sometimes referred to as "mean value calculation processing". With this mean value calculation processing, the image processing section 52 calculates one-dimensional data in which gradation values are corresponded to X coordinates (a mean value of gradation values of a plurality of pixels aligned in the Y direction).

Figure 9:
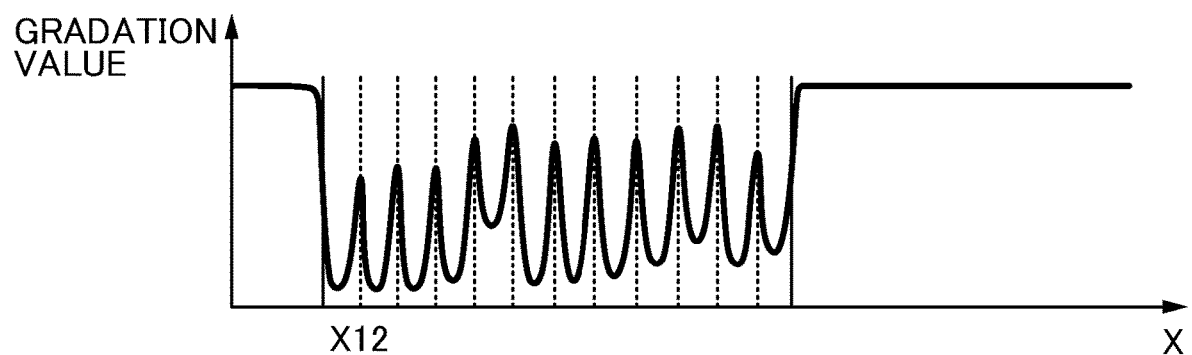
FIG. 9 is a graph of one-dimensional data obtained with mean value calculation processing according to one or more embodiments.

FIG. 9 is a graph of one-dimensional data obtained in the mean value calculation processing according to one or more embodiments. A horizontal axis in the drawing shows X coordinates (positions of pixels aligned in the X direction), and a vertical axis in the figure shows gradation values (a mean value of gradation values of a plurality of pixels aligned in the Y direction).

As the optical fibers 3 are arranged along the Y direction in the two-dimensional image, in the positions (X coordinates) in which the optical fibers 3 are placed, dark gradation value pixels are aligned in the Y direction. Thus, in the one-dimensional data after the mean value calculation processing, the gradation values (mean values) corresponded to the positions (X coordinates) in which the optical fibers 3 are placed show dark gradation values.

On the other hand, the non-connection parts 7 between adjacent two optical fibers 3 in the two-dimensional image are also arranged along the Y direction, and in positions between two optical fibers 3 (X coordinates) light gradation value pixels (pixels showing non-connection parts 7) are mixed along the Y direction. Thus, with the one-dimensional data after the mean value calculation processing, gradation values (mean values) corresponded to positions (X coordinates) between two optical fibers 3 shows relatively light gradation values.

The graph of the one-dimensional data in the figure shows dotted lines in peak positions of the gradation values, and here 11 peak positions are shown. The peak positions in the figure are arranged at approximately even intervals. The gradation values in the peak positions show light gradation values, and the peak positions show boundary positions of adjacent two optical fibers 3. In other words, the boundary positions show positions of connection parts 5 and non-connection parts 7 between adjacent two optical fibers 3.

Next, the image processing section 52 obtains peak positions of one-dimensional data after the mean value calculation processing, and determines the peak positions as boundary positions between adjacent two optical fibers 3 (FIG. 6: S004). In the case of the 12-core intermittent connection type optical fiber ribbon 1, as shown with dotted lines in FIG. 9, 11 boundary positions (X coordinates) are determined. The 11 boundary positions are X coordinates at approximately even intervals. Here, one X coordinate of the 11 boundary positions is X12. The boundary positions determined at this time (X coordinates) may be an integer (positions of pixels aligned in the X direction), or may be a decimal (an intermediate position between a pixel and a pixel). Further, extreme values showing peak positions of dotted lines in the figure may be a maximum value (a peak value) or may be a minimum value (a bottom value) of gradation values.

Next, the image processing section 52 extracts gradation values along the Y direction of the boundary positions (X coordinates) based on the above-described two-dimensional image data (FIG. 6: S005). In this way, the image processing section 52 extracts one-dimensional data (boundary data) in which gradation values in the Y coordinates are corresponded to every boundary position. In the case that the boundary positions (X coordinates) are integers, gradation values of the plurality of pixels aligned in the Y direction are extracted in boundary positions (X coordinates). Further, in the case that the boundary position is a decimal (an intermediate position between a pixel and a pixel), the gradation values are calculated with interpolation processing.

Figure 10:
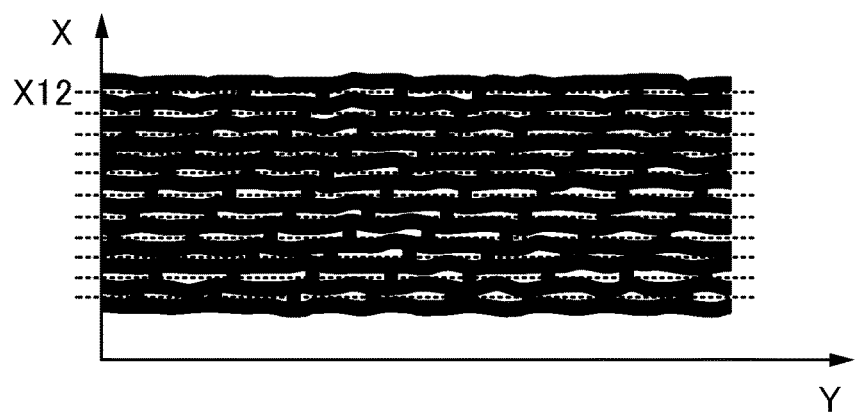
FIG. 10 is an explanatory view of extracting boundary data in a boundary position (for example, coordinate X12) from a two-dimensional image according to one or more embodiments.

FIG. 10 is an explanatory view showing extraction of boundary data from a boundary position (for example, coordinate X12) of a two-dimensional image according to one or more embodiments. The image processing section 52 extracts, for example, gradation values on a dotted line along the Y direction in the figure. As the gradation values in the boundary position (X coordinate) show gradation values between two adjacent optical fibers 3, boundary data extracted along the Y direction in the boundary position (X coordinate) is data showing an image (one-dimensional image) between two adjacent optical fibers 3. In other words, the boundary data extracted along the Y direction in the boundary position corresponds to one-dimensional image data showing connection parts 5 and non-connection parts 7 arranged intermittently in the longitudinal direction.

Figure 11A:
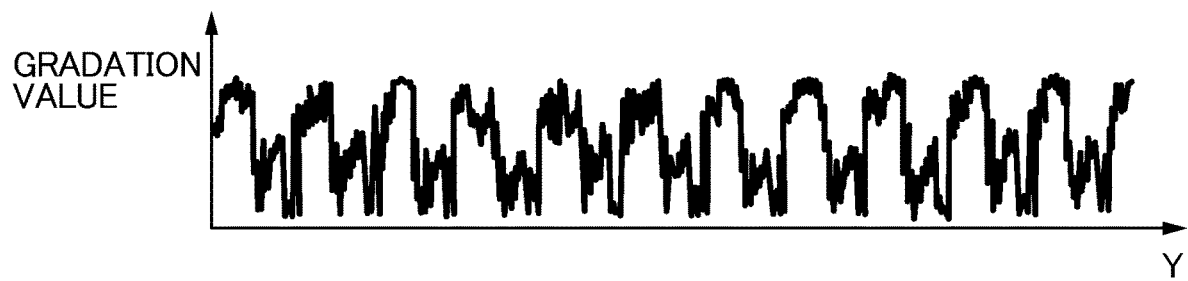
FIG. 11A is an explanatory view of boundary data obtained in S005 according to one or more embodiments.

FIG. 11A is an explanatory view of boundary data obtained in S005. The boundary data is data of a one-dimensional image in which gradation values are corresponded to the Y coordinates. An area of dark gradation values in the figure shows an area of connection parts 5. Further, in the figure an area of the light gradation value shows an area of non-connection parts 7. Thus, based on the boundary data of FIG. 11A, a connection state between two adjacent optical fibers 3 can be evaluated. In one or more embodiments, however, after various filters have been applied to the boundary data, evaluation parameters are obtained (S006 to S008), and the connection state is evaluated (S009).

Figure 11B:
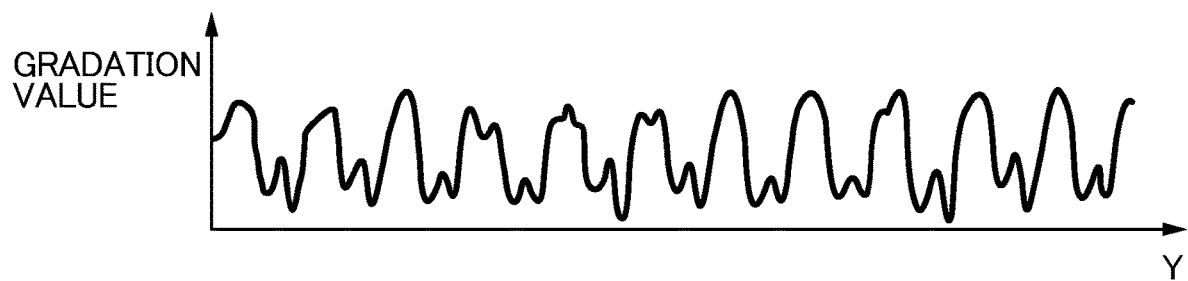
FIG. 11B is an explanatory view of boundary data after a low-pass filter has been applied.

First, the image processing section 52 performs noise removal processing to the boundary data obtained in S005 (FIG. 6: S006). Specifically, the image processing section 52 applies a low-pass filter to the boundary data, to remove noise from the boundary data obtained in S005. FIG. 11B is an explanatory view of the boundary data after applying the low-pass filter. By removing noise from the boundary data, the length and count values (described below) of the connection parts 5 and the non-connection parts 7 can be specified with high accuracy.

Figure 11C:
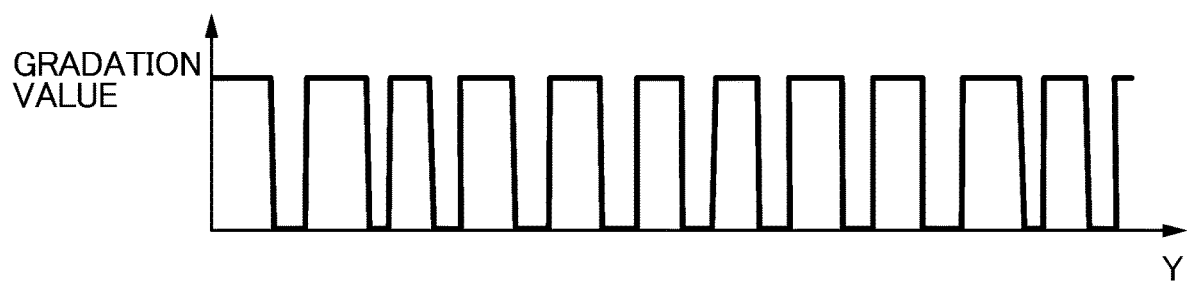
FIG. 11C is an explanatory view of boundary data after binarization processing.

Further, the image processing section 52 binarizes the boundary data (FIG. 6: S007). The gradation values of the boundary data after binarization is to be binary data showing either the connection part 5 or the non-connection part 7. FIG. 11C is an explanatory view of the boundary data after binarization. Either the connection part 5 or the non-connection part 7 exists between adjacent two optical fibers 3, thus the connection state can be shown by binary data. By binarizing boundary data, an area of the connection part 5 and an area of the non-connection part 7 between adjacent two optical fibers can be clearly divided.

In one or more embodiments, the image processing section 52 does not have to perform filtering processing such as noise removal processing or binarization to the boundary data. Further, the image processing section 52 may perform filtering processing different from noise removal processing and binarization to the boundary data.

Next, the image processing section 52 specifies evaluation parameters to evaluate the connection state based on boundary data (boundary data that has undergone noise removal processing and binarization) (FIG. 6: S008). As evaluation parameters, there are, for example, lengths of connection parts 5 and non-connection parts 7, number of counts of connection parts 5 and non-connection parts 7 (number per unit length), ratios of connection parts 5 and non-connection parts 7 (occupancy), positions of connection parts 5 and non-connections part 7, and the like. The image processing section 52 may calculate evaluation parameters (length, number of counts, ratios and the like of connection parts 5 and non-connection parts 7) based on each boundary data, independent for every boundary position of 11 boundary positions. The image processing section 52 may further obtain an evaluation parameter showing a relation of relative connection states between boundary positions (for example, whether the connection part 5 is arranged slanted and the like), from an evaluation parameter based on boundary data in a certain boundary position (positions of connection parts 5 and non-connection parts 7) and an evaluation parameter based on boundary data in another boundary position (positions of connection parts 5 and non-connection parts 7).

The image processing section 52 may display numerical values and graphs and the like of evaluation parameters on a display not shown as an inspection result. In this case, the supervisor of the manufacturing line can evaluate the connection states of the intermittent connection type optical fiber ribbon 1 based on the numerical values of the evaluation parameters and the graphs and the like displayed on the display. The image processing section 52 of one or more embodiments, however, automatically evaluates connection states of the intermittent connection type optical fiber ribbon 1 as below.

The image processing section 52 determines the quality of the intermittent connection type optical fiber ribbon 1, based on the evaluation parameters (FIG. 6: S009). For example, the image processing section 52 compares the evaluation parameters obtained in S008 with predetermined thresholds, to determine whether the intermittent connection type optical fiber ribbon 1 is good/poor. In this way, the image processing section 52 can automatically evaluate the connection state of the intermittent connection type optical fiber ribbon 1.

According to one or more embodiments, the control section 50 makes the camera 41 repeatedly perform capturing an image of an optical fiber ribbon 1 along the width direction, while moving the intermittent connection type optical fiber ribbon 1 in the longitudinal direction, accumulates one-dimensional images of an optical fiber ribbon 1 in the width direction, and creates a two-dimensional image by arranging the accumulated plurality of one-dimensional images in the Y direction (a direction orthogonal to an X direction in which pixels configuring the one-dimensional image are aligned). In this way, regardless of the number of optical fibers of the intermittent connection type optical fiber ribbon 1, the connection state of the intermittent connection type optical fiber ribbon 1 can be inspected with high accuracy.

In the case that the connection state of the intermittent connection type optical fiber ribbon 1 is satisfactory, manufacturing of the optical fiber ribbon 1 is continued, whereas in the case that the connection state of the intermittent connection type optical fiber ribbon 1 is poor, the apparatus 10 for manufacturing may be stopped. Stopping of the apparatus 10 for manufacturing may be performed manually by the supervisor of the manufacturing line, or may be performed automatically based on a determination result of the image processing section 52. Then, after the apparatus 10 for manufacturing line is stopped, the supervisor of the manufacturing line may check, for example, tension of optical fibers 3 in the ribbon forming section 20, positional relation between the coating die 24A, separating section 24B, and the optical fibers 3 and the like, and may perform repairs.

OTHER POINTS

The above embodiments are for facilitating understanding of the present invention, and do not limit understanding of the present invention. The present invention may be changed and modified without departing from the gist thereof, and further it is needless to say that the present invention includes its equivalents.

REFERENCE SIGNS LIST

1 intermittent connection type optical fiber ribbon,
3 optical fiber,
5 connection part,
7 non-connection part,
9 ultraviolet curable resin,
10 apparatus for manufacturing,
20 ribbon forming section,
22 optical fiber supplying section,
24 intermittently applying section,
24A coating die,
24B separating section,
26 light source,
30 tension adjusting section,
31 dancer roller,
40 measuring section,
41 CCD sensor,
42 illuminating device,
43 guide roller,
43A guide groove,
43B step portion,
44 linear velocity sensing section,
50 control section,
51 camera control section,
52 image processing section,
61 take-over device,
62 take-up device Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A method for inspecting an intermittent connection type optical fiber ribbon comprising:
    accumulating one-dimensional images in a width direction of the intermittent connection type optical fiber ribbon arranged intermittently with resin that connects adjacent optical fibers by repeatedly capturing images of the intermittent connection type optical fiber ribbon along the width direction while moving the intermittent connection type optical fiber ribbon in a longitudinal direction; and
    creating a two-dimensional image of the intermittent connection type optical fiber ribbon by aligning the one-dimensional images in a second direction orthogonal to a first direction where pixels configuring the one-dimensional image are aligned, wherein
    a parallel light is irradiated at the intermittent connection type optical fiber ribbon, and
    a light quantity distribution in the width direction of leakage light through the intermittent connection type optical fiber ribbon is detected via a telecentric optical system to obtain the one-dimensional images.

2. The method according to claim 1, wherein
a non-connection part of the intermittent connection type optical fiber ribbon is widened in the width direction to open the non-connection part as the intermittent connection type optical fiber ribbon is moved in the longitudinal direction, and
at least one of the images of the intermittent connection type optical fiber ribbon is captured before the widened non-connection part closes.

3. The method according to claim 2, wherein the non-connection part of the intermittent connection type optical fiber ribbon is widened using a guide roller that includes a step portion disposed at a bottom portion of a guide groove.

4. The method according to claim 1, wherein the repeated capturing of the images is synchronized with a linear velocity of the intermittent connection type optical fiber ribbon.

5. The method according to claim 4, wherein when a shorter one of a resin and a non-connection part of the intermittent connection type optical fiber ribbon includes a length L, the images of the intermittent connection type optical fiber ribbon is repeatedly captured along the width direction every time the intermittent connection type optical fiber ribbon moves by a distance L in the longitudinal direction.

6. The method according to claim 1, wherein
based on the two-dimensional image, calculating a mean value of gradation values of a plurality of pixels aligned in the second direction for each position of pixels configuring the one-dimensional image, and
based on an extreme value of each of the mean values, determining a boundary position of at least one of the adjacent optical fibers in the two-dimensional image.

7. The method according to claim 6, wherein obtaining boundary data that indicates the one-dimensional image in the boundary position by extracting gradation values along the second direction in the boundary position.

8. The method according to claim 7, wherein a low-pass filter is applied to the boundary data.

9. The method according to claim 7, wherein binarization processing is applied to the boundary data.

10. The method according to claim 7, wherein
a first evaluation parameter is calculated based on the boundary data, and
a connection state of the intermittent connection type optical fiber ribbon is evaluated based on the first evaluation parameter.

11. The method according to claim 10, wherein a second evaluation parameter showing a relation of a relative connection state between boundary positions is further calculated from a third evaluation parameter based on the boundary data in a first boundary position and a fourth evaluation parameter based on the boundary data in a second boundary position.

12. The method according to claim 1, wherein
a non-connection part of the intermittent connection type optical fiber ribbon is widened, using a guide roller that includes a step portion disposed at a bottom portion of a guide groove, in the width direction to open the non-connection part as the intermittent connection type optical fiber ribbon is moved in the longitudinal direction, and
at least one of the images of the intermittent connection type optical fiber ribbon is captured before the widened non-connection part closes.

13. An apparatus for inspecting an intermittent connection type optical fiber ribbon, comprising:
a camera that captures an image along a width direction of the intermittent connection type optical fiber ribbon arranged intermittently with resin that connects adjacent optical fibers while moving the intermittent connection type optical fiber ribbon in a longitudinal direction; and
a computer that:
causes the camera to repeatedly capture the image of the intermittent connection type optical fiber ribbon along the width direction to accumulate one-dimensional images of the intermittent connection type optical fiber ribbon in the width direction, and
aligns the one-dimensional images in a second direction orthogonal to a first direction where pixels configuring the one-dimensional image are aligned to create a two-dimensional image of the intermittent connection type optical fiber ribbon, wherein
a parallel light is irradiated at the intermittent connection type optical fiber ribbon, and
a light quantity distribution in the width direction of leakage light through the intermittent connection type optical fiber ribbon is detected via a telecentric optical system to obtain the one-dimensional images.

14. A method for manufacturing an intermittent connection type optical fiber ribbon comprising:
manufacturing the intermittent connection type optical fiber ribbon arranged intermittently with resin that connects adjacent optical fibers;
accumulating one-dimensional images of the intermittent connection type optical fiber ribbon in a width direction of the intermittent connection type optical fiber ribbon by repeatedly capturing an image of the intermittent connection type optical fiber ribbon along the width direction while moving the intermittent connection type optical fiber ribbon in a longitudinal direction; and
creating a two-dimensional image of the intermittent connection type optical fiber ribbon by aligning the one-dimensional images in a second direction orthogonal to a first direction aligned with pixels configuring the one-dimensional image, wherein
a parallel light is irradiated at the intermittent connection type optical fiber ribbon, and
a light quantity distribution in the width direction of leakage light through the intermittent connection type optical fiber ribbon is detected via a telecentric optical system to obtain the one-dimensional images.

15. An apparatus for manufacturing an intermittent connection type optical fiber ribbon comprising:
a ribbon forming section that forms the intermittent connection type optical fiber ribbon arranged intermittently with resin that connects adjacent optical fibers;
a camera that captures an image of the intermittent connection type optical fiber ribbon along a width direction of the intermittent connection type optical fiber while moving the intermittent connection type optical fiber ribbon in a longitudinal direction; and
a computer that:
causes the camera to repeatedly capture the image of the intermittent connection type optical fiber ribbon along the width direction to accumulate one-dimensional images of the intermittent connection type optical fiber ribbon in the width direction, and
aligns the one-dimensional images in a second direction orthogonal to a first direction where pixels configuring the one-dimensional images are aligned to create a two-dimensional image of the intermittent connection type optical fiber ribbon, wherein a parallel light is irradiated at the intermittent connection type optical fiber ribbon, and a light quantity distribution in the width direction of leakage light through the intermittent connection type optical fiber ribbon is detected via a telecentric optical system to obtain the one-dimensional images.

16. A method for inspecting an intermittent connection type optical fiber ribbon comprising:

accumulating one-dimensional images in a width direction of the intermittent connection type optical fiber ribbon arranged intermittently with resin that connects adjacent optical fibers by repeatedly capturing images of the intermittent connection type optical fiber ribbon along the width direction while moving the intermittent connection type optical fiber ribbon in a longitudinal direction;

creating a two-dimensional image of the intermittent connection type optical fiber ribbon by aligning the one-dimensional images in a second direction orthogonal to a first direction where pixels configuring the one-dimensional image are aligned;

based on the two-dimensional image, calculating a mean value of gradation values of a plurality of pixels aligned in the second direction for each position of pixels configuring the one-dimensional image; and based on an extreme value of each of the mean values, determining a boundary position of at least one of the adjacent optical fibers in the two-dimensional image.

17. An apparatus for inspecting an intermittent connection type optical fiber ribbon, comprising:

a camera that captures an image along a width direction of the intermittent connection type optical fiber ribbon arranged intermittently with resin that connects adjacent optical fibers while moving the intermittent connection type optical fiber ribbon in a longitudinal direction; and a computer that:

causes the camera to repeatedly capture the image of the intermittent connection type optical fiber ribbon along the width direction to accumulate one-dimensional images of the intermittent connection type optical fiber ribbon in the width direction, aligns the one-dimensional images in a second direction orthogonal to a first direction where pixels configuring the one-dimensional image are aligned to create a two-dimensional image of the intermittent connection type optical fiber ribbon, based on the two-dimensional image, calculates a mean value of gradation values of a plurality of pixels aligned in the second direction for each position of pixels configuring the one-dimensional image, and based on an extreme value of each of the mean values, determines a boundary position of at least one of the adjacent optical fibers in the two-dimensional image.

18. A method for manufacturing an intermittent connection type optical fiber ribbon comprising:

manufacturing the intermittent connection type optical fiber ribbon arranged intermittently with resin that connects adjacent optical fibers;

accumulating one-dimensional images of the intermittent connection type optical fiber ribbon in a width direction of the intermittent connection type optical fiber ribbon by repeatedly capturing an image of the intermittent connection type optical fiber ribbon along the width direction while moving the intermittent connection type optical fiber ribbon in a longitudinal direction;

creating a two-dimensional image of the intermittent connection type optical fiber ribbon by aligning the one-dimensional images in a second direction orthogonal to a first direction aligned with pixels configuring the one-dimensional image;

based on the two-dimensional image, calculating a mean value of gradation values of a plurality of pixels aligned in the second direction for each position of pixels configuring the one-dimensional image; and based on an extreme value of each of the mean values, determining a boundary position of at least one of the adjacent optical fibers in the two-dimensional image.

19. An apparatus for manufacturing an intermittent connection type optical fiber ribbon comprising:

a ribbon forming section that forms the intermittent connection type optical fiber ribbon arranged intermittently with resin that connects adjacent optical fibers;

a camera that captures an image of the intermittent connection type optical fiber ribbon along a width direction of the intermittent connection type optical fiber while moving the intermittent connection type optical fiber ribbon in a longitudinal direction; and a computer that:

causes the camera to repeatedly capture the image of the intermittent connection type optical fiber ribbon along the width direction to accumulate one-dimensional images of the intermittent connection type optical fiber ribbon in the width direction, aligns the one-dimensional images in a second direction orthogonal to a first direction where pixels configuring the one-dimensional images are aligned to create a two-dimensional image of the intermittent connection type optical fiber ribbon, based on the two-dimensional image, calculates a mean value of gradation values of a plurality of pixels aligned in the second direction for each position of pixels configuring the one-dimensional image, and based on an extreme value of each of the mean values, determines a boundary position of at least one of the adjacent optical fibers in the two-dimensional image.

* * * * *